(12) United States Patent
Pabalkar (10) Patent No.: US 11,137,815 B2
(45) Date of Patent: Oct. 5, 2021

(54) METERING GPU WORKLOAD WITH REAL TIME FEEDBACK TO MAINTAIN POWER CONSUMPTION BELOW A PREDETERMINED POWER BUDGET

(71) Applicant: NVIDIA Corporation, Santa Clara, CA (US)

(72) Inventor: Amit Pabalkar, Fremont, CA (US)

(73) Assignee: NVIDIA Corporation, Santa Clara, CA (US)

( * ) Notice: Subject to any disclaimer, the term of this patent is extended or adjusted under 35 U.S.C. 154(b) by 414 days.

(21) Appl. No.: 15/922,579

(22) Filed: Mar. 15, 2018

(65) Prior Publication Data

US 2019/0286214 A1    Sep. 19, 2019

(51) Int. Cl.
*G06F 1/3287* (2019.01)
*G06F 1/3228* (2019.01)
*G06T 1/20* (2006.01)

(52) U.S. Cl.
CPC .......... *G06F 1/3228* (2013.01); *G06F 1/3287* (2013.01); *G06T 1/20* (2013.01)

(58) Field of Classification Search
CPC .... G06F 1/3228; G06F 1/3243; G06F 1/3287; G06T 1/20
See application file for complete search history.

(56) References Cited

U.S. PATENT DOCUMENTS

| | | | |
|---|---|---|---|
| 8,060,765 B1 | 11/2011 | Cha et al. | |
| 8,102,398 B2 | 1/2012 | Bajic et al. | |
| 8,527,794 B2 | 9/2013 | Ibrahim et al. | |
| 8,780,121 B2 | 7/2014 | Chong et al. | |
| 8,868,945 B2 | 10/2014 | Marinkovic et al. | |
| 9,086,707 B2 | 7/2015 | Zhao | |
| 9,195,285 B2 | 11/2015 | Gorbatov et al. | |
| 9,250,665 B2 | 2/2016 | Avkarogullari et al. | |
| 9,348,393 B1 | 5/2016 | Jane | |
| 9,390,461 B1 | 7/2016 | Jane et al. | |
| 9,430,242 B2 | 8/2016 | Nelson et al. | |
| 9,449,994 B2 | 9/2016 | Kwon et al. | |

(Continued)

OTHER PUBLICATIONS

Advanced Micro Devices Inc.(AMD); AMD FirePro W5000 Graphics, www.amd.com/firepro, Aug. 7, 2012.

(Continued)

*Primary Examiner* — Jaweed A Abbaszadeh
*Assistant Examiner* — Brian J Corcoran
(74) *Attorney, Agent, or Firm* — Shook, Hardy & Bacon LLP (57) ABSTRACT

Embodiments of the present invention provide methods and apparatus for metering GPU workload in real time. Metering of the GPU workload is performed by a Workload Metering (WLM) algorithm implemented in software or firmware that calculates a duty cycle for the graphics engine. The duty cycle forces the graphics engine to transition from a busy state to an idle state periodically based on measured power consumption, and engages race-to-sleep techniques to place the engine or engines in a low power state during the forced idle times, thereby reducing the overall power draw of the GPU to meet a predetermined power budget. According to some embodiments, the WLM algorithm is deployed on a microcontroller of a power management unit (PMU).

21 Claims, 7 Drawing Sheets

(56) References Cited

U.S. PATENT DOCUMENTS

| | | | |
|---|---|---|---|
| 9,460,483 B2 | 10/2016 | Govindaraju et al. | |
| 9,494,998 B2 | 11/2016 | Sodhi et al. | |
| 9,606,602 B2 | 3/2017 | Suryanarayanan et al. | |
| 9,652,026 B2 | 5/2017 | Park et al. | |
| 9,671,845 B2 | 6/2017 | Conroy et al. | |
| 9,898,333 B2 * | 2/2018 | Park | G06F 9/485 |
| 10,373,287 B2 * | 8/2019 | Iwamoto | G06F 9/485 |
| 2008/0244285 A1 * | 10/2008 | Fleming | G06F 1/3228 |
| | | | 713/300 |
| 2014/0022266 A1 * | 1/2014 | Metz | G06T 1/20 |
| | | | 345/522 |
| 2014/0136862 A1 | 5/2014 | Zhao | |
| 2014/0184617 A1 * | 7/2014 | Palmer | G06T 1/20 |
| | | | 345/506 |
| 2014/0237272 A1 | 8/2014 | Sadowski | |
| 2015/0058650 A1 * | 2/2015 | Varma | G06F 1/3287 |
| | | | 713/324 |
| 2016/0006433 A1 * | 1/2016 | Ishizu | H03K 19/0008 |
| | | | 327/427 |
| 2017/0060220 A1 | 3/2017 | Grossmann et al. | |
| 2019/0164328 A1 * | 5/2019 | Acharya | G06F 9/4887 |

OTHER PUBLICATIONS

Peddersen, J., & Parameswaran, S. (2008). Low-impact processor for dynamic runtime power management. IEEE Design & Test of Computers, 25(1), 52-62.

Choi, J., Jung, B., Choi, Y., & Son, S. (2017). An adaptive and integrated low-power framework for multicore mobile computing. Mobile Information Systems, 2017.

Advanced Micro Devices, Inc. (Mar. 23, 2012). White Paper AMD Powertune Technology.

* cited by examiner

METERING GPU WORKLOAD WITH REAL TIME FEEDBACK TO MAINTAIN POWER CONSUMPTION BELOW A PREDETERMINED POWER BUDGET

FIELD OF THE INVENTION

Embodiments of the present invention are generally related to the field of graphics processing units (GPUs). More specifically, embodiments of the present invention relate to systems and methods for regulating power consumption of a GPU in real time.

BACKGROUND OF THE INVENTION

GPUs are employed in a wide variety of platforms, including consumer products and enterprise technology. As GPUs become more powerful and complex, increasing cooling and power management requirements become important considerations. In general, the power consumption of the GPU cannot exceed the power limits that the regulator can supply. Further, the GPU cannot consume power beyond the limits that the power delivery network and the individual GPU components can support. Further, the GPU should not consume more power than can be dissipated due to thermal characteristics of the circuit.

Powerful and complex GPUs are being used in products where there is no active cooling and the power budget allocated to the GPUs is very small in relation to the power they consume if allowed to operate at full throttle. Currently, many GPUs rely on microcontroller-based software controllers that modulate the performance state (p-state) of the GPU to increase or decrease power consumption, or rely on modulating the core clock frequency and/or voltages of the GPU (e.g., using V/F switches) to adjust power consumption based on measured or estimated power draw. However, changing clock frequencies while keeping the voltage fixed at a minimum level ($V_{min}$) to operate the GPU provides diminishing returns and is not suitable for many power constrained devices. Most modern GPUs typically employ a dynamic voltage frequency scaling technique to scale clock frequencies and rail voltages to meet the given performance and power requirements, and an adaptive voltage frequency scaling (AVFS) technique for increasing the power efficiency of the GPU. While these techniques are highly effective in achieving their respective goals, their effectiveness is limited to regions of the Voltage/Frequency curve above the $V_{min}$. Below $V_{min}$, the power and performance scales poorly because clock reduction using linear dividers and/or pulse skippers is very coarse-grained.

Pulse skipping is another known technique for reducing the effective frequency of a GPU. However, this technique experiences issues due to board level resonance and other issues that require greater power margins for operation. In some cases, where the power budget available to the GPU is relatively low, a less powerful GPU may disadvantageously be selected to operate within the given power limitations, which may lead to unsatisfactory performance.

Accordingly, what is needed is an approach to managing GPU power consumption that reduces the overall power draw of the GPU over a relatively long period of time without substantially degrading the performance of the GPU. What is further needed is a complementary, effective and cross-platform solution that can operate below $V_{min}$ to meet the highly constrained operating requirements of many GPU implemented devices.

SUMMARY OF THE INVENTION

Embodiments of the present invention provide methods and apparatus for metering GPU workload in real time. Metering of the GPU workload is performed by a Workload Metering (WLM) process implemented in software or firmware that calculates a duty cycle for the graphics engine. The duty cycle forces the graphics engine to transition from a busy state to an idle state periodically based on measured power consumption, and engages race-to-sleep techniques to place the graphics engine or engines in a low power state during the forced idle times, thereby reducing the overall power draw of the GPU to meet a predetermined power budget. According to some embodiments, the WLM process is deployed as an algorithm on a microcontroller such as a power management unit (PMU).

The adaptive workload metering process (WLM) is implemented as a PMU based software controller that solves a set of power questions to determine the duty cycle period between the active and quiescent phase of various GPU engines such that the actual average power remains less than or equal to a target power provided a priori. In accordance with embodiments of the present invention, the actual power consumption is measured in real time from either an external power sensor or a block activity counter present inside the respective engines. The controller then executes a complex host preempt sequence to force the current active channel off the DMA and then engages method blockers between the host and the engine to prevent further in flight work from being sent to the graphics engine. Once the work is blocked, it quickly engages low power sleep states like engine level power gating (ELPG) or voltage retention to reduce the total power consumption of the graphics engine.

According to one exemplary embodiment, a method of managing a workload for a graphics engine of a graphics processing unit is disclosed. The method includes estimating a dynamic power consumption of the graphics engine using one or more block activity monitors, calculating a duty cycle of the graphics engine based on the dynamic power consumption and a predetermined power budget, throttling execution of the graphics engine using the duty cycle such that the dynamic power consumption of the engine is less than the power budget, where the duty cycle defines an active period and an idle period of an execution cycle of the graphics engine, performing computations using the graphics engine during the active period, and entering a low power state during the idle period, where entering the low power state includes powering down the graphics engine component of the GPU. Power consumption determinations and duty cycle computations are performed in real time.

In another exemplary embodiment, an apparatus for managing a workload of a graphics engine of a graphics processing unit is disclosed. The apparatus includes a power sensor for real time estimation of a dynamic power consumption of the graphics engine, and a controller for determining if an actual workload of the graphics engine exceeds a predetermined workload budget of the graphics engine based on the dynamic power consumption, calculating in real time a duty cycle of the graphics engine based on the dynamic power consumption when the actual workload of the graphics engine exceeds the workload budget of the graphics engine, where the duty cycle defines an active period and an idle period of an execution cycle of the graphics engine, and performing workload management when the actual workload of the graphics engine exceeds the workload budget of the graphics engine, where the workload management forces the graphics engine to enter an idle state (and powered in a low power state) during the idle period, and activating the graphics engine during the active period.

According to a further embodiment, a non-transitory computer readable medium including a plurality of programmed instructions, which when executed by a microcontroller in a computing device is operable to perform workload management for a graphics engine of a graphics processing unit (GPU), is disclosed. The programmed instructions include instructions to estimate a dynamic power consumption of the graphics engine using results from a block activity monitor, instructions to calculate a duty cycle of the graphics engine based on the dynamic power consumption and a power budget, and instructions to throttle execution of the graphics engine using the duty cycle such that the dynamic power consumption is less than the power budget. The duty cycle defines an active period and an idle period of an execution cycle of the graphics engine, and the GPU performs computations using the graphics engine during the active period. The instructions also include instructions to place the graphics engine into a low power state during the idle period, where entering the low power state includes powering down the graphics engine component of the GPU.

According to some embodiments, the dynamic power consumption of a graphics engine may be determined by determining a number of times sequential circuits or "flops" of the graphics engine have been toggled, assigning weights to signals of the graphics engine, multiplying said number of times by said weights to generate weighted values, and summing the weighted values to estimate said dynamic power consumption.

According to some embodiments, throttling execution of the graphics engine using the duty cycle includes engaging a hold-off blocker between a host of the GPU and the graphics engine to prevent new work from flowing to the graphics engine during idle periods of the duty cycle.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Portions of the detailed description that follow are presented and discussed in terms of a process. Although operations and sequencing thereof are disclosed in a figure herein (e.g., FIGS. 3A and 3B) describing the operations of this process, such operations and sequencing are exemplary. Embodiments are well suited to performing various other operations or variations of the operations recited in the flowchart of the figure herein, and in a sequence other than that depicted and described herein.

As used in this application the terms controller, module, system, and the like are intended to refer to a computer-related entity, specifically, either hardware, firmware, a microcontroller, a combination of hardware and software, software, or software in execution. For example, a module can be, but is not limited to being, a process running on a processor, an integrated circuit, an object, an executable, a thread of execution, a program, and or a computer. By way of illustration, both an application running on a computing device and the computing device can be a module. One or more modules can reside within a process and/or thread of execution, and a component can be localized on one computer and/or distributed between two or more computers. In addition, these modules can be executed from various computer readable media having various data structures stored thereon.

GPU Workload Metering with a Determined Duty Cycle to Achieve a Prescribed Power Budget Embodiments of the present invention provide methods and apparatuses for metering GPU workload in real time. Metering of the GPU workload is performed by a Workload Metering (WLM) algorithm implemented in software or firmware that calculates a duty cycle for the graphics engine to maintain engine power consumption within a prescribed budget. The duty cycle forces the graphics engine to transition from a busy state to an idle state periodically based on measured real time power consumption, and engages race-to-sleep techniques to place the engine or engines in a low power state during the forced idle times, thereby reducing the overall power draw of the GPU to meet the predetermined power budget. According to some embodiments, the WLM algorithm is deployed on a microcontroller of a power management unit (PMU), which is tightly coupled to the GPU.

Figure 1:
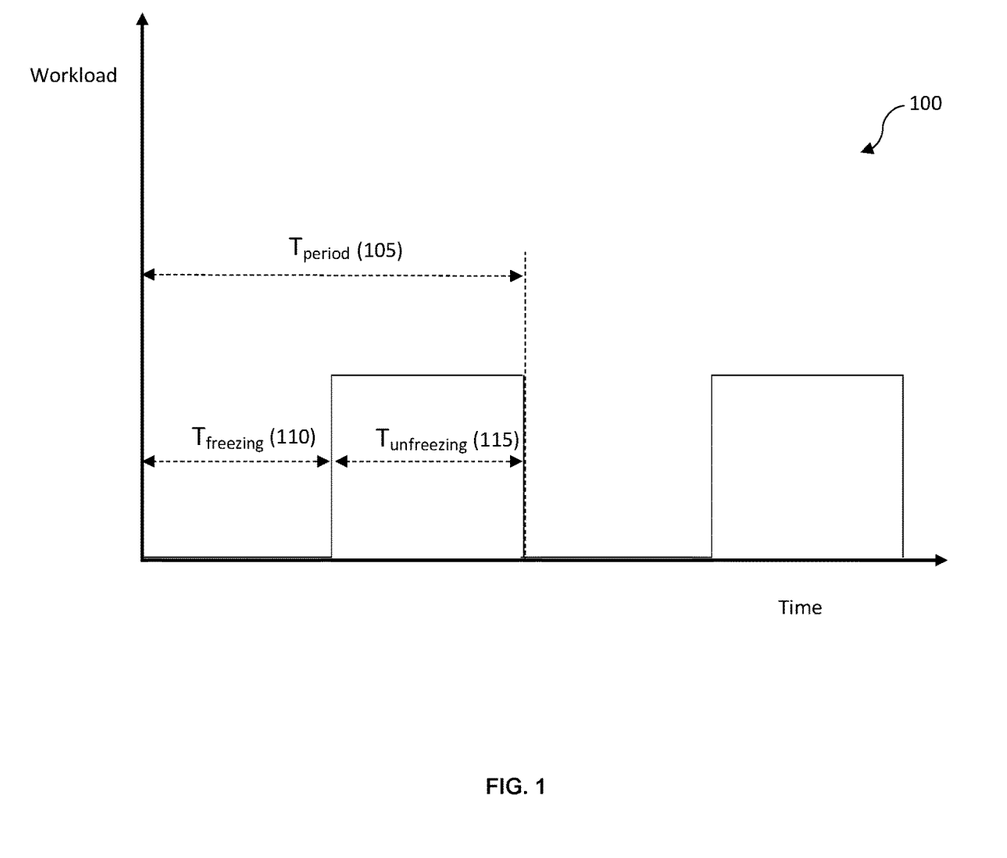
FIG. 1 is a graph illustrating an exemplary duty cycle of a GPU cycling between active and idle states according to embodiments of the present invention.

With regard to FIG. 1, a graph 100 illustrating an exemplary duty cycle of a GPU cycling over time between active and idle states is depicted according to embodiments of the present invention. The left axis of the graph represents the workload of the GPU, and the bottom axis represents the passage of time. In $T_{period}$ 105, the GPU transitions from an idle state to an active state. During $T_{freezing}$ 110, the GPU may enter a low power state and new work may be blocked from entering the GPU. In this way, power is conserved as the GPU engine becomes idle. For example, during $T_{freezing}$ 110, dynamic power can be saved by forcing the graphics engine to idle as well as idling the portion of the host that feeds work to the graphics engine using ELPG or other engine level low power features. The idle portion 110 and therefore the busy portion 115 are dynamically altered in real time in response to: 1) a measured power consumption of the engine, and 2) a predetermined power budget. The idle portion of $T_{period}$ 105 may be computed as:

$$T_{freezing} = T_{period}\left(1 - \frac{W_{budget}}{W_{actual}}\right),$$

where $W_{budget}$ represents a workload budget or target, and $W_{actual}$ represents the actual workload of the GPU engine measured in real time. Leakage power is reduced during $T_{freezing}$ 110 by power grating the graphics engine (e.g., using method blockers) so that new work is blocked from the graphics engine. Subsequently, during $T_{unfreezing}$ 115, the GPU engine is activated (e.g., un-gated) and receives new work. $T_{unfreezing}$ 115 may be computed as:

$$T_{unfreezing} = T_{period} - T_{freezing}.$$

Dynamic Duty Cycle Calculation and Implementation

Embodiments of the present invention employ an integrated process that uses real time feedback from an internal power sensor (e.g., block activity) or an external power sensor (e.g., an INA sensor) for measuring the real time power consumption of a GPU. Block activity logic provides estimates of power consumption based on signals internal to the GPU using a block activity monitor. Based on the real time power feedback, a duty cycle is calculated representing an active time and an idle time for throttling the workload flowing into the main graphics engine of the GPU. According to some embodiments, the process is executed by a micro-controller on the GPU having very low latency access to both the power sensors and other GPU hardware resources (e.g., GPU hardware registers). According to some embodiments, the process is implemented as a power management unit (PMU) based controller, and the metering functionality is tightly coupled with the power gating loop such that the power gating can reduce power aggressively and opportunistically to prevent GPU throttling when the power metering determines that power gating would be impossible or ineffective.

The duty cycle for throttling the workload of the main graphics engine of the GPU is computed from the dynamic power component $P_{dynamic}$ using the power equation:

$$P_{actual} = P_{dynamic} + P_{leakage} \quad (I)$$

$$P_{dynamic} = W_{actual} * V_{set}^2 * F_{set} \quad (II)$$

Power leakage is computed or estimated using standard leakage equations, and the current actual power is measured or estimated by a power sensor (e.g., a block activity monitor or external power sensor). The dynamic power may be represented using Equation III.

$$P_{dynamic} = P_{actual} - P_{leakage} \quad (III)$$

Given the above equations, the actual workload is computed as:

$$W_{actual} = \frac{P_{dynamic}}{V_{set}^2 * F_{set}} \quad (IV)$$

Provided a power budget $P_{budget}$, the work budget $W_{budget}$ is computed using Equation V, where the GPU is running at $V_{set}$ and $F_{set}$.

$$W_{budget} = \frac{P_{budget}}{V_{set}^2 * F_{set}} \quad (V)$$

The duty cycle is computed as:

$$D_{cycle} = \text{Min}\left(\frac{W_{budget}}{W_{actual}}, 1\right) = \text{Min}\left(\frac{P_{budget}}{P_{actual}}, 1\right) \quad (VI)$$

The time of a cycle duration $T_{cycle}$ is defined and provided to the throttling loop, and based on the $D_{cycle}$ calculated using Equation VI, the throttling loop enables a callback every $D_{cycle} * T_{cycle}$ to force the engine to idle using workload metering techniques. An exemplary duty cycle of 0.4 indicates that the GPU engine is active for 40% of the $T_{cycle}$ duration, and idle for 60% of the $T_{cycle}$ duration. An exemplary duty cycle of 1.0 indicates that the GPU engine is active for 100% of the $T_{cycle}$ (effectively disabling the throttling loop for a period of time).

Compared to existing approaches that throttle frequency to reduce power consumption, the duty cycle based throttling loop of the embodiments of the present invention more efficiently conserves power in power constrained environments by throttling the workload, and is able to more accurately respond to real time feedback because the duty cycle is adjusted periodically based on feedback provided by power sensors.

A table of variable definitions used in the disclosed equations is provided below in Table I:

TABLE I

| Variable | Definition | Variable | Definition |
|---|---|---|---|
| $P_{actual}$ | Actual power | $F_{set}$ | Set frequency |
| $P_{dynamic}$ | Dynamic power | $P_{budget}$ | Power budget/target |
| $P_{leakage}$ | Power leakage | $W_{budget}$ | Work budget |
| $W_{actual}$ | Actual workload | $D_{cycle}$ | Duty cycle (ratio) |
| $V_{set}$ | Set voltage | $T_{cycle}$ | Cycle duration (time) |

Exemplary GPU with Hold-Off Mechanism

Figure 2A:
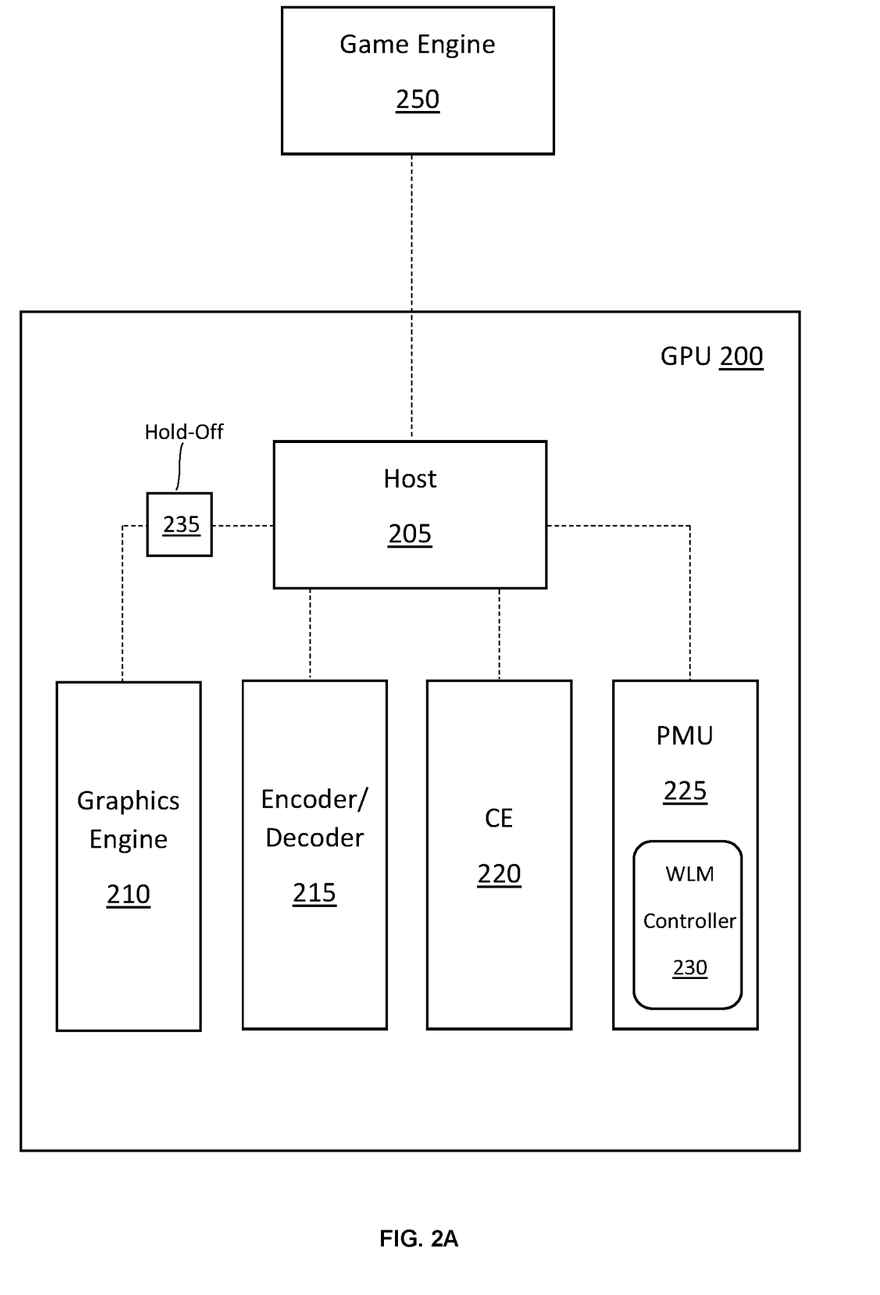
FIG. 2A is a block diagram depicting an exemplary GPU receiving and executing work from an exemplary game engine according to embodiments of the present invention.

With regard to FIG. 2A, an exemplary GPU 200 receiving and executing work from an exemplary game engine 250 is depicted according to embodiments of the present invention.

It is appreciated that any work source could be used and the game engine 250 is merely exemplary. The work is received at a host (e.g., a host driver) 205 of the GPU 200. Accordingly, the host 205 distributes the work to various exemplary circuits including graphics engine 210, video encoder/decoder 215, and copy engine 220. The graphics engine 210 is operable to render and process frame data received from game engine 250 to generate rendered frames for external display. Video encoder/decoder 215 encodes and decodes video frames using well-known video encoding and decoding techniques. Copy engine 220 is a direct memory access (DMA) mechanism that enables the transfer of data between the computer system and the GPU while a kernel is executed on the GPU.

The GPU 200 also includes a Power Management Unit (PMU) 225 that manages the power delivery network of the GPU 200. The PMU 225 includes a WLM controller 230 to implement the duty cycle based throttling mechanism for metering and controlling GPU workload in real time in accordance with embodiments of the present invention. Based on the duty cycle, which may be calculated according to real time feedback received from a block activity monitor, the WLM controller causes the graphics engine 210 to become idle for a period of time, $T_{freezing}$. During the idle state of the graphics engine 210, a hold-off mechanism 235 is activated to prevent new work from flowing to the graphics engine 210. After $T_{freezing}$ has expired, during $T_{unfreezing}$, the graphics engine 210 is active and the hold-off mechanism 235 is disabled so that the graphics engine 210 can receive new work from the host 205.

Block Activity Monitor

A block activity monitor is an internal GPU component used to estimate power consumption based on internal GPU signals. Compared to external power sensors, a block activity monitor is much less expensive to implement. However, while external sensors are operable to provide actual power measurements, a block activity monitor is used to provide estimations of real time power consumption. Based on the real time estimated power consumption provided by the block activity monitor, a duty cycle based throttling loop is applied to incoming engine traffic, and race-to-sleep techniques are engaged to place the graphics engine or engines in a low power state during forced idle times, thereby reducing the overall power draw of the GPU.

According to some embodiments, a signal or signals are assigned to different graphics engines, and the signals are monitored by one or more block activity monitors. Each signal is assigned a weight, and a block activity monitor counts the flip-flop activity of each signal. The toggle count of each signal is multiplied by the signal weight, and the results are summed for each engine. According to some embodiments, the estimated power consumption for multiple graphics engines are summed to calculate an overall power consumption estimate of a GPU. The flip-flops selected for counting and the weights assigned above are determined a priori to accurately estimate power consumption.

Figure 2B:
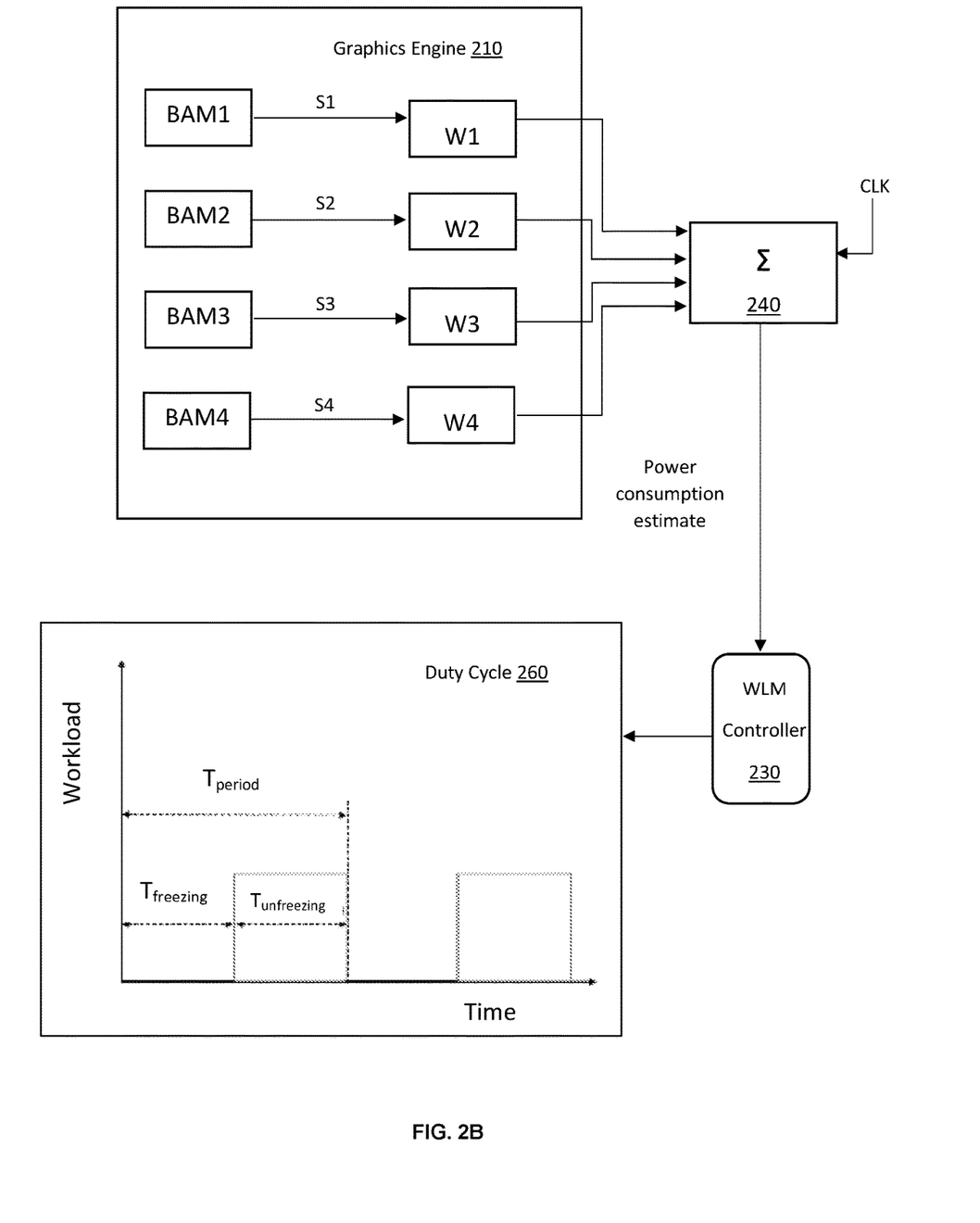
FIG. 2B is a block diagram depicting an exemplary graphics engine with block activity monitors for generating signals that are weighted and summed to estimate real time power consumption of the graphics engine according to embodiments of the present invention.

With regard to FIG. 2B, an exemplary graphics engine 210 having block activity monitors BAM1-BAM4 for measuring activity of the graphics engine 210 to estimate the real time power consumption thereof is depicted according to embodiments of the present invention. The block activity monitors count the number of times a sequential circuit (e.g., a flip-flop) of the graphics engine is activated or toggled. The block activity monitor generates a signal representing the count that is weighted and summed to determine the overall estimated power consumption in real time. The flip-flops selected for counting and the weights assigned thereto are determined a priori. For example, BAM1 generates signal $S_i$, which is multiplied by weight W1, BAM2 generates signal S2, which is multiplied by weight W2, and so on. The weighted counts of the block activity monitors BAM1-BAM4 are summed together by summation unit 240, and the summed total is provided to the WLM controller 230 for calculating a duty cycle 260 based on the estimated power consumption.

The block activity monitors described herein may be used as described in U.S. Pat. No. 8,060,765, granted Nov. 15, 2011 to NVIDIA Corporation, according to embodiments of the present invention.

Exemplary Workload Throttling Process

Figure 3A:
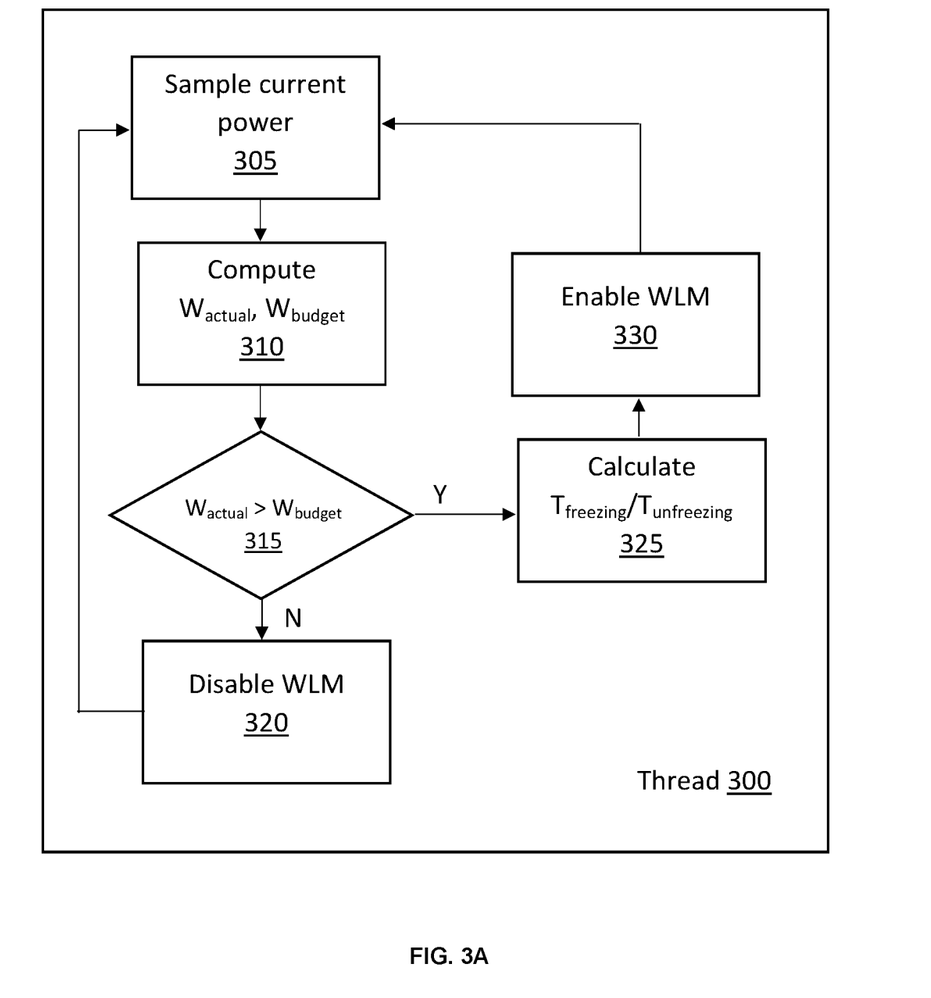
FIG. 3A is a flowchart depicting an exemplary sequence of computer controlled steps for executing and calculating a duty cycle according to embodiments of the present invention.
Figure 3B:
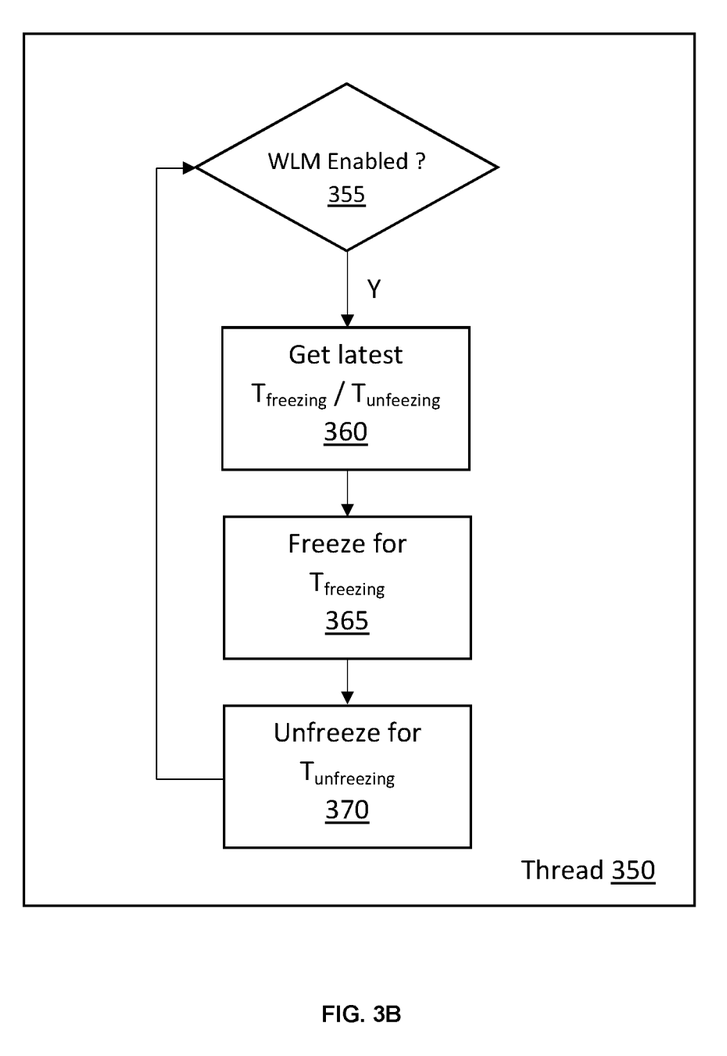
FIG. 3B is a flowchart depicting an exemplary sequence of computer controlled steps for enforcing a duty cycle to throttle the workload of a graphics engine according to embodiments of the present invention.

With regard to FIGS. 3A and 3B, a flowchart depicting an exemplary sequence of computer implemented steps or microcontroller implemented steps for executing a Workload Management Algorithm is depicted according to embodiments of the present invention. At step 305, thread 300 samples the current power consumption of the GPU using results generated by a block activity monitor or external power sensor. At step 310, thread 300 computes $W_{actual}$ and $W_{budget}$, for example, using Equations (IV) and (V). At step 315, thread 300 determines if $W_{actual}$ exceeds $W_{budget}$. $W_{actual}$ does not exceed $W_{budget}$, Workload Management is disabled at step 320. If step 315 determines that $W_{actual}$ exceeds $W_{budget}$, thread 300 calculates $T_{freezing}/T_{unfreezing}$ for implementing a duty cycle to manage the workload of the GPU at step 325. At step 330, WLM is enabled, and the duty cycle is enforced so that a graphics engine of the GPU is forced into an idle state during the $T_{freezing}$ portion of the cycle. During the idle state, hold off circuit 235 disables graphics data from going to the graphics engine 210. After step 320 or 330, the process returns to step 305, the current power is sampled, and the steps are repeated.

Thread 350 waits for WLM to be enabled at step 355. When thread 350 determines that WLM is enabled, the most recent $T_{freezing}$ and $T_{unfreezing}$ is obtained (e.g., retrieved from a hardware register) at step 360. At step 365, thread 350 causes the graphics engine of the GPU to enter an idle state for the duration of $T_{freezing}$. At step 370, thread 350 causes the graphics engine to enter an active state for the duration of $T_{unfreezing}$. While in the active state, the hold-off circuit 235 allows data flow to the graphics engine 210 again. Subsequently, the process returns to step 355 and the thread 350 again determines if WLM is enabled, and if so, steps 360, 365, and 370 are repeated until WLM is disabled.

Figure 4:
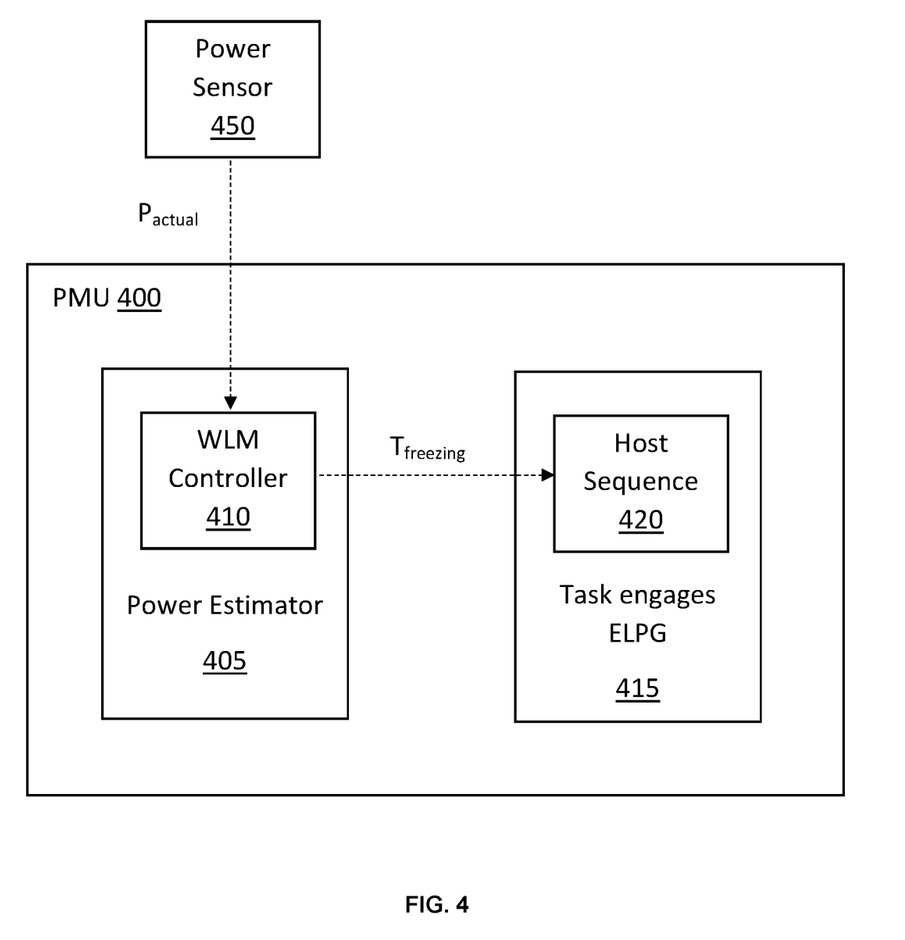
FIG. 4 is a block diagram and data flow diagram depicting an exemplary Power Management Unit for enforcing a duty cycle to manage the workload of a GPU in accordance with a power budget according to embodiments of the present invention.

With regard to FIG. 4, a block diagram and data flow diagram depicting an exemplary Power Management Unit 400 for enforcing a duty cycle to manage the workload of a GPU is depicted according to embodiments of the present invention. PMU 400 includes a WLM controller 410 that calculates $T_{freezing}$ for implementing a duty cycle based on real time feedback received from a power sensor (e.g., a block activity monitor). The WLM controller 410 may be a microcontroller that executes a WLM algorithm implemented in software or firmware. According to some embodiments, input for the WLM controller 410 is provided by a Power Estimator task 405 executed by the PMU. The WLM controller 410 provides the $T_{freezing}$ to a host sequence that is executed to enforce a duty cycle corresponding to $T_{freezing}$.

A task 415 executed by the PMU engages ELPG or other low power features of the GPU during the idle portion.

Workload Throttling with Noise Aware Clocking

In some cases, throttling GPU engine workload using techniques described herein can induce unwanted noise when the GPU voltage rises. To reduce the amount of noise induced by throttling, some GPUs may use Adaptive Voltage and Frequency Scaling (AVFS) to perform noise aware clocking, where the clock rate can be adjusted based on the noise levels observed. According to some embodiments, a dual-level power gating mechanism is employed, where the gates are staggered such that they can be opened and closed at slightly different times. In this way, the gates may be opened in stages to provide more responsive throttling. According to some embodiments, the power gating mechanism is a sliding power gate that can slowly and gradually throttle power to reduce noise induced by the throttling loop.

According to some embodiments, throttling a graphics engine's workload requires preempting work that is already running on the engine (e.g., mid-context interruption). For example, in the case of long running graphic shaders or compute workloads, preemption may be performed using mid-triangle preemption and/or compute preemption. According to some embodiments, frame aligned sampling is used to prevent the preemption of a graphics engine while a frame is being processed or rendered. Rather, frame aligned sampling ensures that the graphics engine is preempted only when the processing or rendering of a frame has been completed.

According to some embodiments, the GPU has a separate voltage rail for the graphics engine, and the graphics engine is set to retention voltage, thereby simplifying the control loop to include only the throttling aspect without requiring engine-level power gating.

According to some embodiments, a duty cycle based throttling mechanism as described herein is activated when the set voltage ($V_{set}$) reaches a minimum voltage ($V_{min}$) of the GPU.

According to some embodiments, the workloads of multiple GPUs are monitored and adjusted concurrently such that the overall workload is balanced among the plurality of GPUs.

Exemplary Computer System

Figure 5:
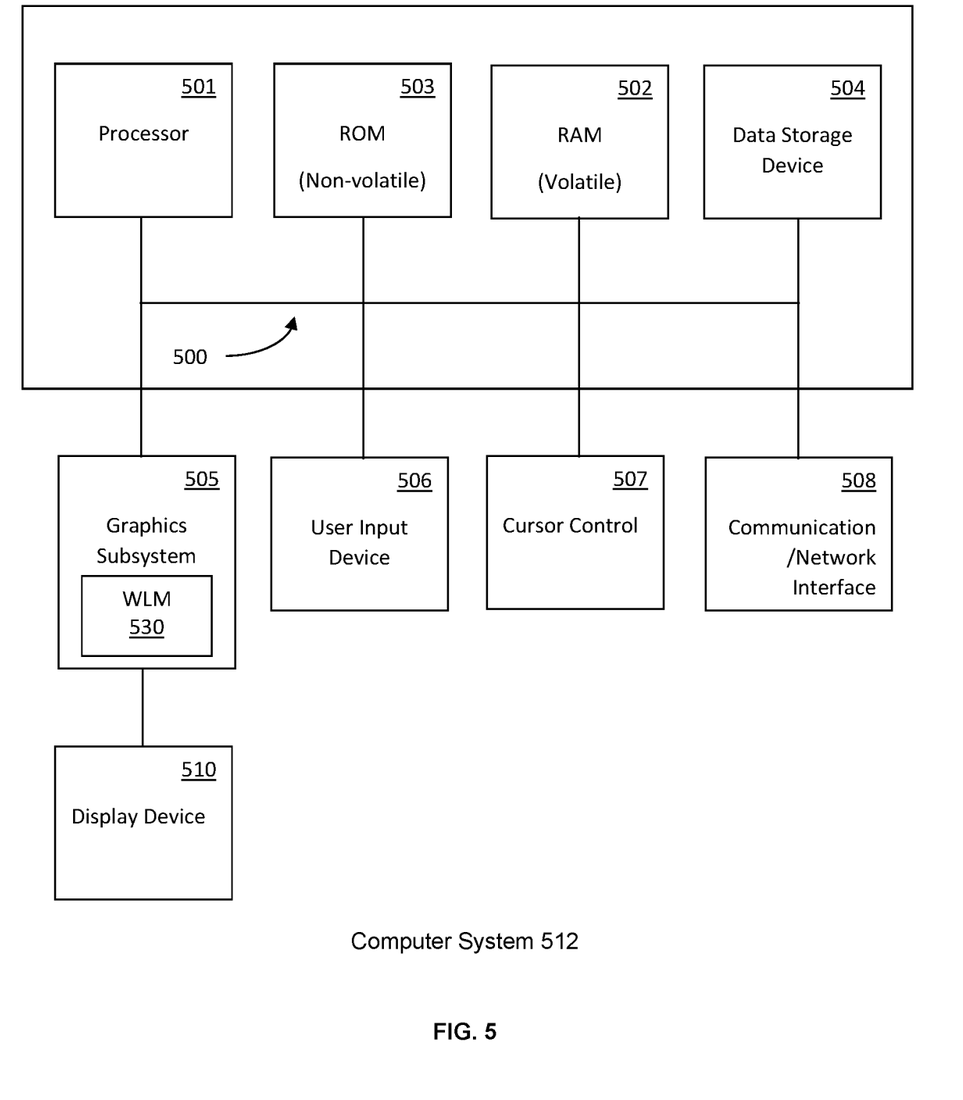
FIG. 5 is a block diagram depicting an exemplary generic computer system upon which embodiments of the present invention may be implemented.

Embodiments of the present invention provide methods and systems for metering GPU workload in a computer system using circuit 530. The following discussion describes one such exemplary computer system.

In the example of FIG. 5, the exemplary computer system 512 includes a central processing unit (CPU) 501 for running software applications and optionally an operating system. Random access memory 502 and read-only memory 503 store applications and data for use by the CPU 501. Data storage device 504 provides non-volatile storage for applications and data and may include fixed disk drives, removable disk drives, flash memory devices, and CD-ROM, DVD-ROM or other optical storage devices. The optional user inputs 506 and 507 comprise devices that communicate inputs from one or more users to the computer system 512 (e.g., mice, joysticks, cameras, touch screens, and/or microphones).

A communication or network interface 508 allows the computer system 512 to communicate with other computer systems, networks, or devices via an electronic communications network, including wired and/or wireless communication and including an Intranet or the Internet. The display device 510 may be any device capable of displaying visual information in response to a signal from the computer system 512 and may include a flat panel touch sensitive display, for example. The components of the computer system 512, including the CPU 501, memory 502/503, data storage 504, user input devices 506, and graphics subsystem 505 may be coupled via one or more data buses 500.

In the embodiment of FIG. 5, a graphics sub-system 505 may be coupled with the data bus and the components of the computer system 512. The graphics system may comprise a physical graphics processing unit (GPU) and graphics/video memory. Graphics sub-system 505 can output display data to display device 510. Computer System 512 has a prescribed power budget, and a WLM circuit 530 monitors and adjusts the duty cycle to achieve the power budget. Graphics sub-system 505 may include one or more rasterizers, transformation engines, and geometry engines, and generates pixel data from rendering commands to create output images. The physical GPU of graphics sub-system 505 can be configured as multiple virtual GPUs that may be used in parallel (e.g., concurrently) by a number of applications or processes executing in parallel, or multiple physical GPUs may be used simultaneously. As depicted in FIG. 2A, the GPU of graphics sub-system 505 may include a power management unit, a host driver, one or more graphics engines, and a copy engine.

WLM circuit 530 is configured to implement a duty cycle based throttling mechanism for metering and controlling GPU workload in real time in accordance with embodiments of the present invention. Based on the duty cycle, which may be calculated according to real time feedback received from a block activity monitor of a graphics engine of graphics subsystem 505, the WLM controller causes the graphics engine to become idle for a period of time. During the idle state of the graphics engine, a hold-off, mechanism of the GPU is activated to prevent new work from flowing to the graphics engine. After the idle period, during an active period of the graphics engine, the hold-off mechanism is disabled so that the graphics engine can receive new work. According to some embodiments, WLM circuit 530 is implemented as a controller within the power management unit of the GPU.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system.

These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above disclosure. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. A method of managing power consumption of a graphics engine of a graphics processing unit (GPU), the method comprising:
    computing a power consumption estimate of the graphics engine using a block activity monitor internal to the GPU, the power consumption estimate comprising a value representative of a number of activations of sequential circuit elements processing one or more signals;
    determining that the power consumption estimate is greater than a predetermined power budget of the graphics engine;
    based at least in part on the power consumption estimate being greater than the predetermined power budget, dynamically calculating a duty cycle value of the graphics engine based at least in part on the value and the predetermined power budget;
    determining, based at least in part on the duty cycle value, an active period and an idle period for an execution cycle of the graphics engine;
    processing, during the active period of the execution cycle, work received from a host driver using the graphics engine by, at least in part, opening a first power gate at a first time to process a first portion of the work and opening a second power gate at a second time different from the first time to process a second portion of the work; and
    during the idle period of the execution cycle:
        signaling to the host driver to cease from sending new work to the graphics engine;
        preempting the work using frame aligned sampling after processing of a current frame is completed; and
        based at least in part on the preempting, entering a low power state of the graphics engine by, at least in part, closing the first power gate at a third time and closing the second power gate at a fourth time different from the third time.

2. The method of claim 1, wherein the entering the low power state comprises powering down the graphics engine of the GPU.

3. The method of claim 2, wherein the computing the power consumption estimate of the graphics engine comprises:
    determining a number of times flops of the graphics engine have been toggled to generate signals thereof;
    assigning weights to the signals of the graphics engine;
    multiplying the number of times by the weights to generate weighted values; and
    summing the weighted values to perform the computing the power consumption estimate.

4. The method of claim 1, wherein the entering the low power state comprises activating an engine level power gating (ELPG) feature of the GPU.

5. The method of claim 1, further comprising engaging a hold-off blocker between the host driver of the GPU and the graphics engine to prevent new work from flowing to the graphics engine during the idle period.

6. The method of claim 1, wherein the preempting includes using at least one preemption technique from the group of preemption techniques comprising:
    mid-triangle preemption; and
    compute preemption.

7. The method of claim 1, wherein at least one of the first power gate or the second power gate includes a sliding power gate such that at least one of the first power gate or the second power gate are at least one of opened or closed gradually.

8. An apparatus for managing a workload of a graphics engine of a graphics processing unit (GPU), the apparatus comprising:
    a power sensor for computing a power consumption estimate of the graphics engine, the power consumption estimate comprising a value representative of a number of activations of sequential circuit elements processing one or more signals; and
    a controller for:
        determining that the power consumption estimate is greater than a predetermined power budget of the graphics engine;
        based at least in part on the power consumption estimate being greater than the predetermined power budged, dynamically calculating a duty cycle value of the graphics engine based at least in part on the value and the predetermined power budget;
        determining, based at least in part on the duty cycle value, an active period and an idle period for an execution cycle of the graphics engine;

controlling, during the active period of the execution cycle, processing of work received from a host driver using the graphics engine such that a first power gate is opened at a first time to process a first portion of the work and a second power gate is opened at a second time different from the first time to process a second portion of the work; and during the idle period of the execution cycle:
signaling to the host driver to cease from sending new work to the graphics engine;
preempting the work using frame aligned sampling after processing of a current frame is completed; and
based at least in part on the preempting, causing the graphics engine to enter a low power state by, at least in part, closing the first power gate at a third time and closing the second power gate at a fourth time different from the third time.

9. The apparatus of claim 8, wherein the controller is further to engage a hold-off blocker between the host driver of the GPU and the graphics engine to prevent new work from flowing to the graphics engine during the idle period.

10. The apparatus of claim 9, wherein the causing the graphics engine to enter the low power state comprises powering down the graphics engine of the GPU.

11. The apparatus of claim 9, wherein the causing the graphics engine to enter the low power state comprises activating an engine level power gating (ELPG) feature of the GPU.

12. The apparatus of claim 8, wherein the power sensor is further for:
determining a number of times flops of the graphics engine have been toggled;
assigning weights to signals of the graphics engine;
multiplying the number of times by the weights to generate weighted values; and
summing the weighted values to perform the computing the power consumption estimate.

13. The apparatus of claim 8, further comprising a hold-off mechanism, and wherein the controller is further for:
executing a host preemption sequence; and
engaging the hold-off mechanism during the idle period.

14. The apparatus of claim 13, wherein at least one of the first power gate or the second power gate includes a sliding power gate such that at least one of the first power gate or the second power gate are at least one of opened or closed gradually.

15. A non-transitory computer readable medium comprising a plurality of programmed instructions, which when executed by a microcontroller in a computing device, cause the microcontroller to perform operations comprising:
computing a power consumption estimate of the graphics engine using a block activity monitor internal to the GPU, the power consumption estimate comprising a value representative of a number of activations of sequential circuit elements processing one or more signals;
determining that the power consumption estimate is greater than a predetermined power budget of the graphics engine;
based at least in part on the power consumption estimate being greater than the predetermined power budget, dynamically calculating a duty cycle value of the graphics engine based at least in part on the value and the predetermined power budget; determining, based at least in part on the duty cycle value, an active period and an idle period for an execution cycle of the graphics engine;
processing, during the active period of the execution cycle, work received from a host driver using the graphics engine by, at least in part, opening a first power gate at a first time to process a first portion of the work and opening a second power gate at a second time different from the first time to process a second portion of the work; and
during the idle period of the execution cycle:
signaling to the host driver to cease from sending new work to the graphics engine;
preempting the work using frame aligned sampling after processing of a current frame is completed; and
based at least in part on the preempting, entering a low power state of the graphics engine by, at least in part, closing the first power gate at a third time and closing the second power gate at a fourth time different from the third time.

16. The non-transitory computer readable medium of claim 15, wherein the block activity monitor monitors circuit activity of the graphics engine.

17. The non-transitory computer readable medium of claim 15, wherein the computing the power consumption estimate of the graphics engine comprises:
determining a number of times flops of the graphics engine have been toggled;
assigning weights to signals of the graphics engine;
multiplying the number of times by the weights to generate weighted values; and
summing the weighted values to perform the computing the power consumption estimate.

18. The non-transitory computer readable medium of claim 15, wherein the entering the low power state comprise activating an engine level power gating (ELPG) feature of the GPU.

19. The non-transitory computer readable medium of claim 15, wherein the operations further comprise engaging a hold-off blocker between the host driver of the GPU and the graphics engine to prevent new work from flowing to the graphics engine during the idle period.

20. The non-transitory computer readable medium of claim 15, wherein the preempting includes using at least one preemption technique from the group of preemption techniques comprising:
mid-triangle preemption; and
compute preemption.

21. The non-transitory computer readable medium of claim 20, wherein at least one of the first power gate or the second power gate includes a sliding power gate such that at least one of the first power gate or the second power gate are at least one of opened or closed gradually.

* * * * *